Oct. 5, 1965  H. T. VAN DER WISSEL  3,210,096
TAPERING PIN-AND-BOX TYPE THREADED COUPLING
Filed Oct. 11, 1962  2 Sheets-Sheet 1

INVENTOR:
HERMAN T. VAN DER WISSEL
BY: H.D.Buch
HIS ATTORNEY

United States Patent Office 3,210,096
Patented Oct. 5, 1965

3,210,096
TAPERING PIN-AND-BOX TYPE THREADED
COUPLING
Herman T. van der Wissel, The Hague, Netherlands, assignor to Shell Oil Company, New York, N.Y., a corporation of Delaware
Filed Oct. 11, 1962, Ser. No. 229,916
Claims priority, application Netherlands, Nov. 7, 1961, 271,091
1 Claim. (Cl. 285—115)

The invention relates to a tapering pin-and-box type threaded coupling provided with at least one shoulder, of which at least one of the screw threads, when unloaded, deviates from a normal tapering thread, in which when the coupling has been screwed up handtight, the screw threads will be in contact at two points, and in which after the box is screwed or shrunk tight around the pin, but without plastic deformation, of the flanks between the two points of contact either the outer flanks of the screw thread on the pin and the inner flanks of the screw thread on the box or the inner flanks of the pin thread and the outer flanks of the box thread are more heavily loaded than the other flanks.

The terms outer and inner flanks of the threads of a screw are to be understood to mean those flanks the faces of which are directed respectively away from or towards a plane normal to the longitudinal axis of the screw thread.

In this coupling after the box has been screwed or shrunk tight around the pin, but without plastic deformation, the outer flanks of the screw thread of the pin and inner flanks of the screw thread of the box are more heavily loaded than the other flanks. When the coupling has been screwed tight, the part of the box which is provided with screw thread is subjected to tensile stresses, while axial compression stresses occur in the part of the pin which is provided with screw thread.

The deviations of at least one of the screw threads of the coupling from a normal tapering thread (viz., a screw thread with a constant pitch and a constant taper) may be arranged in such a way that when the coupling has been screwed tight, the part of the box provided with screw thread is subjected to axial compression and the part of the pin provided with screw thread is under axial tension. In this case the inner flanks of the screw thread of the pin and the outer flanks of the screw thread of the box are more heavily loaded than the other flanks.

The threaded couplings to which the invention relates have the advantage that in the tightly screwed state the load on the flanks is distributed as uniformly as possible over the threads.

In order to achieve this effect the screw threads of the pin and the box, when unloaded, should show certain differences; as far as the result is concerned, it is immaterial whether the differences are obtained by making the screw thread of the pin, the screw thread of the box or both screw threads deviate from the normal screw thread. The only important factors are the positions occupied by the contact flanks of the pin screw thread and the box screw thread (viz., the flanks which are loaded after the coupling has been screwed tight) relative to each other in the unloaded (handtight screwed) state of the coupling. In ascertaining these positions all deformations should be taken into account which, after the coupling has been screwed tight, will occur in the pin and the box as a result of the load distributed (as uniformly as possible) over the contact flanks. Since therefore it is immaterial in which screw thread or screw threads the deviations are made, for the sake of simplicity in practice, only one of the screw threads (preferably the pin screw thread) is provided with the necessary deviations, while the second screw thread is given the form of a normal tapering screw thread.

Couplings as described in the above patent specifications may, if desired, be provided with shoulders. Since the frictional forces necessary for transmitting torsion occur between the contact flanks of the pin and box screw threads, the shoulders should only be lightly loaded, unlike the shoulders of couplings provided with normal tapering screw threads.

The shoulder forces should only be large enough to ensure the sealing between the shoulders and scarcely affects the stress pattern of the parts of the pin and box provided with screw threads. If, however, the coupling is used under conditions in which a varying bending moment is set up together with a great tensile force, wobbling may occur in the coupling since the compression tension between the shoulders decreases as a result of the severe tensile force. It will be obvious that if as a result of the tensile force the shoulders are drawn so far away from each other as to form a slot between the shoulders, the coupling will very soon break through fatigue under the loading conditions described.

The object of the invention is to provide a threaded coupling of the above type by means of which varying bending moments can be transmitted without risk of rupture even when a severe tensile force is exerted.

To this end according to the invention a number of turns are provided on the pin and the box between the shoulder and the nearest point of contact, a slot being present between a set of parallel flanks of these turns when the coupling is in the handtight screwed state, the size of the slot gradually increasing in the direction of the shoulder.

The invention will be further demonstrated with reference to the drawing in which.

Figure 1:
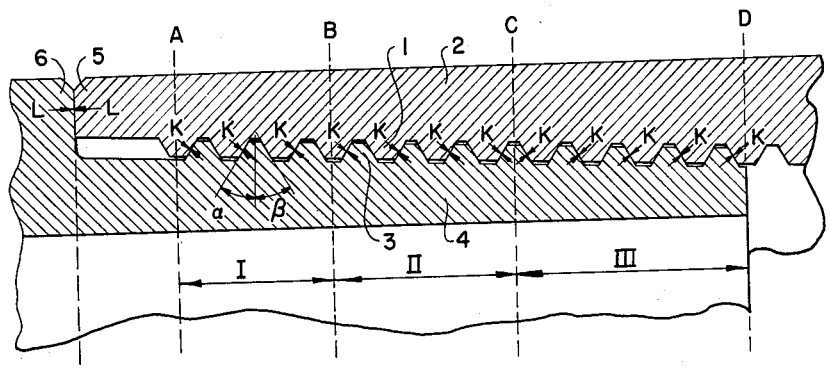
FIGURE 1 is a longitudinal section of a part of a tapering threaded coupling according to the invention in the tightened up position.

FIGURE 1 is a diagram of a longitudinal section of a part of a tapering pin and box type threaded coupling according to the invention in which the actual proportions of the threads have been exaggerated relative to the remainder of the connection in order that the description may be more readily understood. The coupling is shown in the screwed tight state in which the screw thread 1 of the box 2 mates with the screw thread 3 of the pin 4, and the shoulder 5 of the box 2 is in contact with the shoulder 6 of the pin 4. The axial force with which the shoulders 5 and 6 press against each other is designated by L in the figure. It should be noted that if the plane through the shoulders 5 and 6 is not positioned normal to the axis of the coupling, the forces L represent the axial components of the shoulder forces. The forces with which the flanks of the box thread 1 directed towards the plane C press against the flanks of the pin thread 3 directed away from the plane C are designated by K. The drawing shows that the other flanks of the screw threads are in actual contact with each other but are not loaded.

In the following explanation of the manner in which the desired distribution of the forces K over the contacting flanks is obtained, use is made of the planes A, B, C and D which are normal to the axis of the coupling. The planes A and D are passed through the ends of the contacting parts of the threaded connection. The plane B is passed through the locus where the box 2 and the pin 4 are not subject to axial stress, the plane C being passed through the locus where, between the planes B and D, the box 2 is subject to the maximum tensile stress and the pin 4 to the maximum compression stress in an axial direction.

In calculating the threaded coupling according to the invention, the starting point is the load which has to be transmitted by the coupling, and the desired compression force L in the shoulders 5 and 6 is determined as well as the total force exerted by the flank load (viz., the sum of all forces K). In order to make the connection suitable for transmitting the maximum screw torque with given dimensions, the pressure exerted on the faces of the contacting flanks should be as large as the maximum permissible value and hence everywhere of about the same magnitude. Account should also be taken of the proportion of flank pressure exerted by the load transmitted via the coupling. Since the coupling should still be capable of doing its work after having been screwed in and out several times, the pressure exerted on the face of the flanks is such that the formation of the material used which occurs at this pressure fall within the elastic area.

The contacting parts of the screw threads are divided into three zones I, II and III respectively situated between the planes A and B, the planes B and C and the planes C and D. The distances between the planes B, C and D are such that the sum of the axial components of the forces K exerted on the pin in the zone II are in balance with the sum of the axial components of the forces K exerted on the pin in the zone III. In zones II and III the box 2 is subject to axial tensile stresses, and the pin 4 to axial compression stresses. There are no axial stresses in the cross sections of the pin and box at the locus of the plane B. Moreover, the sum of the axial components of the forces K exerted on the pin in the zone I are equal to the shoulder force L.

If the angle $\alpha$ (see FIGURE 1) is different from the angle $\beta$, then since it is necessary for the sum of the axial forces in zone II to be equal to the sum of the axial forces in zone III, the forces K in zone II normal to the contact flanks will differ from the corresponding forces exerted in zone III. This will be the case, for example, when use is made of a sawtooth thread.

Figure 2:
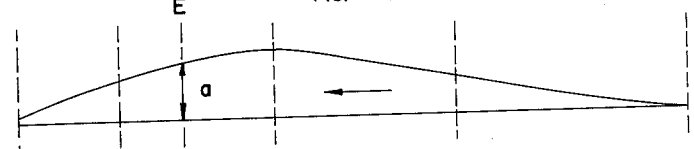
FIGURE 2 is a diagram of the displacements of the longitudinal cross sections of the box as a result of the forces exerted on the flanks of the box thread and the shoulder of the box.

The tensile and compression stresses occurring in the box and pin in an axial direction cause respective lengthening and shortening of the box and the pin. Hence the mutual position the flanks of the pin and those of the box respectively which have to mate with the flanks of the box and pin respectively will, in the unloaded state (viz., the handtight screwed state) differ from the mutual position in the screwed tight state. Thus in determining the locus of those flanks which should finally exert a given flank pressure in the screwed tight state, account should be taken of the lengthening and shortening occurring in the pin and the box. In FIGURE 2 the displacements to which the cross sections of the box are subject in the direction from the plane D as a result of the forces K and the force L, are plotted as a function of the screw thread length. Similarly, the displacements to which the cross sections of the pin are subject in the direction towards the plane D as a result of the forces K and the force L are plotted in FIGURE 3 as a function of the screw thread length.

Examination of the flank of the box screw thread in any cross section E, which flank has to mate with a flank of the pin thread after the coupling has been screwed tight, will show that while the coupling is being screwed tight the box flank moves over the distance "$a$" from the plane D, while at the same time the pin flank moves over the distance "$b$" to the plane D until the pin flank and the box flank in the screwed tight state are in contact under the predetermined pressure to which the faces of the flanks are subject.

Conversely, when the connection shown in FIGURE 1 is unscrewed as a result of the decrease in the face pressure on the flanks, all parts of the box, i.e., including the box flank in cross section E will move towards the plane D, while all parts of the pin, i.e., including the pin flanks in the cross section E, will move away from plane D. While the connection is being unscrewed, the taper of the screw threads will create slots between the flanks which were first in contact with each other. In the case described in which the starting point was a load distributed over the flanks as uniformly as possible, the flank slots between the contact flanks as the coupling is unscrewed will first be formed in zone I, viz., between the parts of the contact flanks closest to plane A. As the connection is unscrewed still further, the slot in zone I progresses in the direction of plane B. Before the flanks in zone I and the shoulders 5 and 6 are entirely apart, slots also form in zones II and III, viz., between the parts of the contact flanks closest to plane C. As the connection is unscrewed still further, these slots progress in the direction of the planes B and D.

Figure 5:
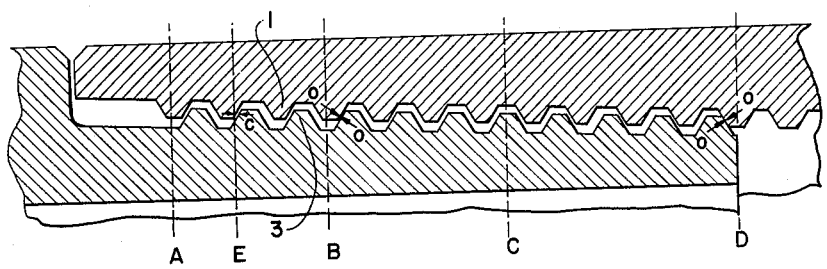
FIGURE 5 is a longitudinal cross-section of the same part of the tapering threaded coupling as shown in FIGURE 1 but in which the coupling is in the handtight screwed state.

Hence as the connection is unscrewed, there is a decrease in the stresses prevailing in the box and the pin in an axial direction. The decrease in the stresses in the parts of the pin and the box situated in zone I is far more rapid than the decrease in the stresses in the parts of the pin and the box situated in zones II and III, viz., so much more rapid that at the moment there are no further stresses in zone I, the original stresses are substantially unchanged in zones II and III, so that the flank load K is still present as shown in FIGURE 1. Since, as observed above, the slots between the contact flanks in zones II and III progress in the direction of the planes B and D as the connection is unscrewed still further, and at the same time there is a decrease in the stresses in zones II and III, at the moment both the pin and the box are entirely stressless, the only contact will be between the pin flanks and the box flanks in planes B and D. FIGURE 5 shows this stressless state of the coupling, the only contact between the pin thread 3 and the box thread 1 being in the planes B and D (when the flank load is equal to zero).

Figure 3:
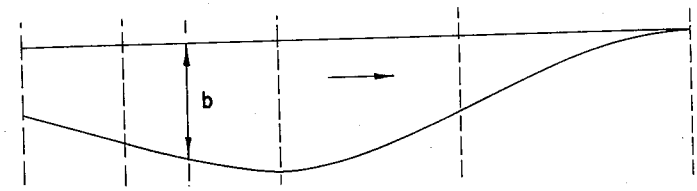
FIGURE 3 is a diagram of the displacements of the longitudinal cross sections of the pin as a result of the forces exerted on the flanks of the pin thread and the shoulder of the pin.
Figure 4:
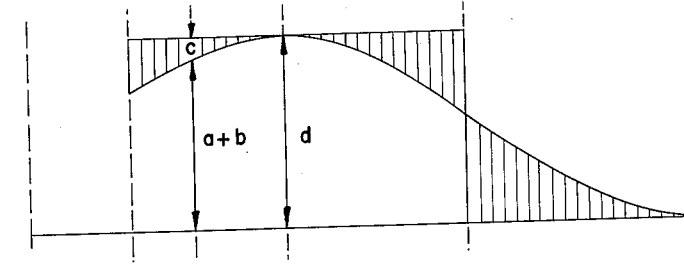
FIGURE 4 is the slot diagram of the connection in the handtight screwed state.

In FIGURE 4 the displacements according to the diagram shown in FIGURES 2 and 3 are summed. If the flank of the pin thread directed towards the plane D (viz., that which is visible from plane D) is defined as the front flank, and the other flank of the pin thread (viz., that which is not visible from plane D) is defined as the rear flank, and the slot adjoining the front flank (rear flank), is defined as the front flank slot (rear flank slot), then it is found that, in order to effect the desired distribution of pressure over the contact flanks, in the handtight screwed state between planes B and D, the sum of the front flank slot and the rear flank slot in each cross section should be equal to the sum of the maximum lengthening of the box and the maximum shortening of the pin occurring between the planes B and D, viz., the value "$d$" shown in plane B. Since in zone III the front flank slot is between the flanks which come into contact after the coupling has been screwed tight under the loads K, in FIGURE 4 the shaded part in zone III represents the slot pattern between the contact flanks in zone III. Since in zones I and II the slot between the flanks which after the coupling has been screwed tight come into contact under a load K is the rear flank slot, the shaded parts in zones I and II in FIGURE 4 represent the slot pattern between the contact flanks situated in zones I and II. In processing the data found according to FIGURE 4 in order to determine the deviation in one or both screw threads, account should be taken of the axial displacement occurring between the contact flanks and between the shoulders as a result of the rotation of the pin relative to the box as the coupling is unscrewed. In this connection it should be noted that the slots between the flanks which after the coupling has been unscrewed do not act as contact flanks for transmitting the forces K may be greater than those shown in FIGURE 4. The calculated flank slots should be closely adhered to only when these flanks come into contact after the coupling has been screwed tight (viz., with a force which is a fraction of the force K), for example, for improving the sealing of the coupling against gas or liquid leakage. It will be obvious that in this case the effect of the forces exerted on the said flanks should be included in the calculation of the diagrams shown in FIGURES 2 and 3.

Hence in the cross section E (situated in the zone I) the slot "c" should be present between the contact flanks in the handtight screwed state. FIGURE 4 now shows that in zone I the size of the slot between the contact flanks (in the handtight screwed state) gradually increases in the direction of the shoulder.

It may be seen from FIGURES 1 to 5 that a threaded joint has been provided wherein the threads of said pin and box are formed in a manner such that at least one of the flanks of said screw threads deviates from the normal tapering thread in such a way that after the box has been screwed handtight around the pin the screw threads will be in flank contact at two points spaced apart by a plurality of threads thereon with opposite facing flanks of the threads on the pin and box at the two points of contact being substantially the sole contact points throughout the thread listed. At the same time slots are formed between the thread flanks of the threads between said two handtight contact points, said slots being so constructed and arranged that upon screw tight condition of the joint substantially loaded on said screw turns will be maximumly loaded on one flank and the other half will be maximumly loaded on the opposite basic flank without loading said threads to cause plastic deformation. The thread configuration is characterized in that at least two thread turns are provided on the pin and the box between the shoulder and the nearest thread contact point, the threads being formed of a size and configuration such that in the handtight space a predetermined slot is formed between the flanks of the forward facing thread flank on said pin and the rearward facing thread flank on said box as related to said shoulder and said terminal end respectively, the size of the slot gradually increasing the direction of the shoulder from the point of thread contact closest to said shoulder when the joint is screwed handtight, the size of said slots being calculated to distribute a load substantially uniformly over said at least two thread turns when the joint is in a tightly screwed state with said terminal end in tight abutment with said shoulder.

Figure 6:
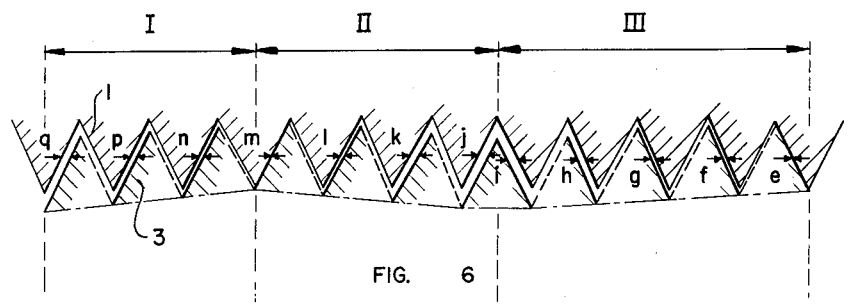
FIGURES 6, 7 and 8 show embodiments of screw threads for use in the coupling according to the invention.
Figure 7:
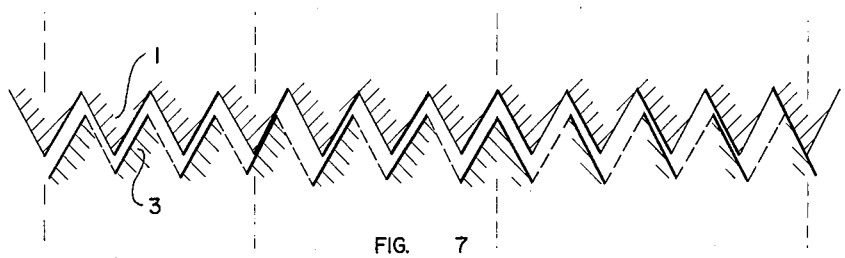
Figure 8:
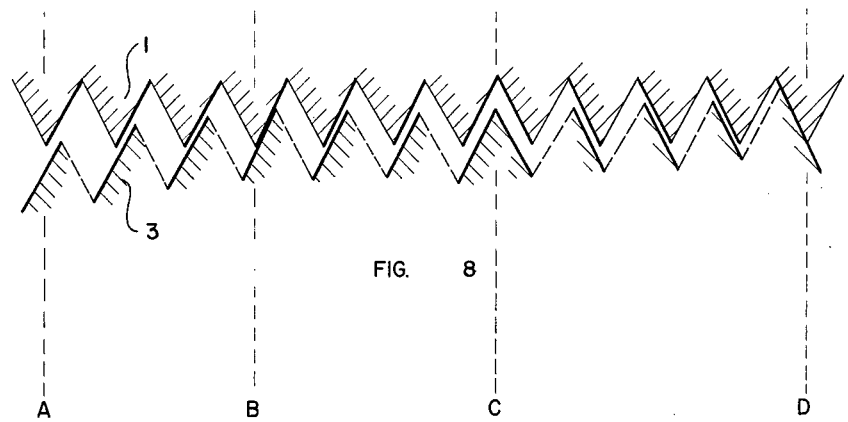

FIGURES 6, 7 and 8 show a number of embodiments of screw threads for use in the tapering threaded coupling according to the invention. For the sake of clarity the deviations used in these screw threads are exaggerated in the drawing and the flattening of the root and crest of the threads as shown in FIGURES 1 and 5 are not drawn. Zones I, II and III and planes A to D shown in FIGURES 6, 7 and 8 correspond to zones I, II and III and planes A to D as shown in FIGURES 1 to 5.

The screw threads shown in FIGURES 6 and 8 are provided with a normal tapering box thread 1. The deviations required for obtaining the most uniformly possible distribution of flank forces K and the shoulder force L are provided in the pin thread 3. The flanks which will come into contact after the coupling has been screwed tight are shown by means of heavy lines. Since, as stated above, there is a certain degree of freedom in a positioning of those flanks of the pin thread 3 which will not come into contact with the flanks of the box thread after the coupling has been screwed tight, the former flanks are indicated by broken lines.

Starting from a normal tapering box thread, the flank slots calculated between the contact flanks and shown in FIGURE 4 are plotted in FIGURE 6 in a direction of the axis (not shown) of the coupling. Account is taken of the axial displacement to which the pin will be subjected relative to the box as the pin is screwed further into the box up to the screwed tight state of the coupling. It is clear that in zone III the flank slot ($e$ to $i$) between the contact flanks gradually increases in the direction away from plane D until the maximum value is reached in plane C. Proceeding in the direction of plane B, there is a gradual decrease in the flank slot ($j$ to $m$) between the contact flanks and the zone II. In plane B the size of the slot $m$ is equal to zero, after which, proceeding in the direction of plane A (viz., in the direction of the shoulder) the slot ($n$ to $q$) gradually increases in size. The contact flanks of the pin screw thread are plotted in a similar manner in FIGURES 7 and 8.

In FIGURE 6 the pin thread is completed by starting from a constant pitch of the crest of the threads of the pin screw thread 3, which pitch is equal to the (constant) pitch of the box thread 1. It is, however, also possible to design a pin screw thread which complies with the requirements by starting from a constant pitch in the root of the grooves of the pin screw thread.

In FIGURE 7 the starting point is a cone of which the axis coincides with the axis of the coupling, the crests of the pin screw thread 3 being situated on the surface of the said cone. In another embodiment (not shown) it is possible to start from a cone of which the axis coincides with the axis of the coupling, but in this case the root of the pin thread is situated in the surface of the cone.

In FIGURE 8 the pitch of the root of the grooves of the pin screw thread 3 is constant but greater than the (constant) pitch of the box thread 1.

In a similar manner it is possible to start from a normal tapering pin screw thread, after which it is possible to construct a box thread provided with the desired deviations with reference to the calculated flank slot ($e$ to $q$) between the contact flanks.

If desired, the deviations required for obtaining the desired flank slot may be distributed over both threads.

Hence in each screw thread, either normally tapering or deviating from a normal tapering screw thread, it is possible to construct a suitable screw thread provided the flank slot between the contact flanks has been calculated.

The invention is not limited to a tapering threaded coupling provided with external shoulders. If desired the shoulders 5 and 6 may also be provided on the interior (to the right of the plane D in FIGURE 1), and it is also possible to use both internal and external shoulders.

I claim as my invention:

A tapering box and pin type thread joint, comprising a pair of members adapted to be joined together coaxially, a box having a screw thread formed thereon and comprising one of said members, a pin having a screw thread formed thereon and comprising the other of said members, one of said members having a substantially radial shoulder formed thereon rearward of said thread, the other of said members having a forward terminal end and shaped to conform to the radial shape of said shoulder to abut and mate therewith, the threads of said pin and box being formed in a manner such that at least one of the flanks of said screw threads deviates from the normal tapering thread in such a way that after the box has been screwed handtight around the pin the screw threads will be in flank contact at two points spaced apart by a plurality of threads thereon with opposite facing flanks of the threads on the pin and box at the two points of contact being substantially the sole contact points throughout the thread length, slots being formed between the thread flanks of the threads between said two handtight contact points, said slots being so constructed and arranged that upon screw tight condition of the joint substantially half of said screw turns will be maximumly loaded on one flank and the other half will be maximumly loaded on the opposite facing flank without loading said threads to cause plastic deformation, the thread configuration being characterized in that at least two thread turns are provided on the pin and the box between the shoulder and the nearest thread contact point, the threads being formed of a size and configuration such that in the handtight state predetermined slot is formed between the flanks of the forward facing thread flank on said pin and the rearward facing thread flank on said box as related to said shoulder and said terminal end respectively, the size of the slot gradually increasing the direction of the shoulder from the point of thread contact closest to said shoulder when the joint is screwed handtight, the size of said slots being calculated to distribute a load substantially uniformly over said at least two thread turns when the joint is in a tightly screwed state with said terminal end in tight abutment with said shoulder.

References Cited by the Examiner
UNITED STATES PATENTS

| | | | |
|---|---|---|---|
| 2,183,644 | 12/39 | Frame | 285—390 X |
| 2,345,725 | 11/44 | Bettis | 285—333 |
| 3,050,318 | 8/62 | Van Der Wissel | 285—334 |
| 3,079,181 | 2/63 | Van Der Wissel | 285—333 |

FOREIGN PATENTS

| | | |
|---|---|---|
| 1,230,856 | 4/60 | France. |
| 567,770 | 3/45 | Great Britain. |

CARL W. TOMLIN, *Primary Examiner.*